(12) United States Patent
Campschroer et al.

(10) Patent No.: US 10,090,623 B2
(45) Date of Patent: Oct. 2, 2018

(54) ENCLOSURE ASSEMBLY FOR A CONNECTOR

(71) Applicants: TE Connectivity Nederland BV, s'Hertogenbosch (NL); Tyco Electronics Svenska AB, Vasby (SE)

(72) Inventors: Dolf Campschroer, Wijchen (NL); Hacan Hyving, Bollnas (SE); Ronald Nico Adriaan Daamen, Vught (NL); Han Van Het Bolscher, Tilburg (NL); William Moonen, Tilburg (NL); Tekke Drijfhout, Nistelrode (NL)

(73) Assignees: TE Connectivity Nederland BV, s'Hertogenbosch (NL); Tyco Electronics Svenska AB, Vasby (SE)

( * ) Notice: Subject to any disclaimer, the term of this patent is extended or adjusted under 35 U.S.C. 154(b) by 0 days.

(21) Appl. No.: 15/627,818

(22) Filed: Jun. 20, 2017

(65) Prior Publication Data
US 2017/0365956 A1    Dec. 21, 2017

(30) Foreign Application Priority Data
Jun. 20, 2016 (EP) .................... 16175265

(51) Int. Cl.
| | |
|---|---|
| *H01R 13/648* | (2006.01) |
| *H01R 13/6581* | (2011.01) |
| *H01R 13/514* | (2006.01) |
| *H01R 13/516* | (2006.01) |
| *H01R 13/52* | (2006.01) |
| *H01R 13/6598* | (2011.01) |

(Continued)

(52) U.S. Cl.
CPC ....... *H01R 13/6581* (2013.01); *H01R 13/514* (2013.01); *H01R 13/516* (2013.01); *H01R 13/521* (2013.01); *H01R 13/5205* (2013.01); *H01R 13/6582* (2013.01); *H01R 13/6598* (2013.01); *G02B 6/4277* (2013.01); *H01R 13/6596* (2013.01); *H01R 2201/02* (2013.01)

(58) Field of Classification Search
CPC .... G02B 6/426; G02B 6/4245; G02B 6/4246; H01R 13/6581; H01R 13/521; H01R 13/65802; H01R 13/5205; H01R 13/516; H01R 13/6598; H01R 13/514
USPC ................................... 439/607.04
See application file for complete search history.

(56) References Cited

U.S. PATENT DOCUMENTS

| | | | |
|---|---|---|---|
| 7,338,214 B1 | 3/2008 | Gurreri et al. | |
| 8,192,231 B2 * | 6/2012 | De Blieck | H01R 13/65802 439/607.04 |

(Continued)

FOREIGN PATENT DOCUMENTS

| | | |
|---|---|---|
| EP | 2302431 A1 | 3/2011 |
| EP | 2354825 A1 | 8/2011 |

(Continued)

OTHER PUBLICATIONS

Extended European Search Report, dated Oct. 27, 2016, 9 pages.

*Primary Examiner* — Jean F Duverne
(74) *Attorney, Agent, or Firm* — Barley Snyder

(57) ABSTRACT

An electromagnetic shielding structure for an electrical connector comprises a tubular hollow body and an inner housing. The tubular hollow body has a plurality of contact springs disposed in an annular orientation. The inner housing is disposed within the contact springs and protects the contact springs.

22 Claims, 5 Drawing Sheets

(51) Int. Cl.
    *H01R 13/6582*     (2011.01)
    *G02B 6/42*     (2006.01)
    *H01R 13/6596*     (2011.01)

(56) References Cited

U.S. PATENT DOCUMENTS

| | | | |
|---|---|---|---|
| 9,039,300 B2 * | 5/2015 | Kondo | G02B 6/426 |
| | | | 385/92 |
| 9,532,490 B2 * | 12/2016 | Bandhu | H05K 9/0016 |
| 9,748,700 B2 * | 8/2017 | Qiao | H01R 13/65802 |
| 2006/0279937 A1 | 12/2006 | Manson et al. | |
| 2008/0047746 A1 | 2/2008 | Chen et al. | |
| 2008/0315528 A1 * | 12/2008 | Moore | G02B 6/4246 |
| | | | 277/314 |
| 2012/0033979 A1 * | 2/2012 | Priyadarshi | G02B 6/4246 |
| | | | 398/141 |
| 2012/0148201 A1 * | 6/2012 | Kondou | G02B 6/4245 |
| | | | 385/92 |

FOREIGN PATENT DOCUMENTS

| | | |
|---|---|---|
| EP | 2579396 A1 | 4/2013 |
| WO | 2010046735 A1 | 4/2010 |

\* cited by examiner

ENCLOSURE ASSEMBLY FOR A CONNECTOR

CROSS-REFERENCE TO RELATED APPLICATION

This application claims the benefit of the filing date under 35 U.S.C. § 119(a)-(d) of European Patent Application No. 16175265.4, filed on Jun. 20, 2016.

FIELD OF THE INVENTION

The present invention relates to an enclosure assembly for an electrical connector and, more particularly, to an enclosure assembly having an electromagnetic shielding structure.

BACKGROUND

Enclosure assemblies for electrical connectors are known in the art. Known enclosure assemblies form a protective shell around the connector. A connector volume formed by the enclosure assembly is large enough to allow accommodation of various sizes of connectors for multiple connectors in a side-by-side arrangement without the need to change an inner and/or outer body of the enclosure assembly; the same enclosure assembly may be used for different connectors. The connector volume is of sufficient size to allow the connector to move within the connector volume, and consequently, the position of the connector within the connector volume can change and tolerances can be compensated. The connector can be safely mated with a respective counterpart.

European Patent No. 2302431 discloses a sealing enclosure assembly for a connector on a cable, the enclosure assembly including a cable seal adapted to sealingly engage the cable, an inner body comprising a connector volume adapted to receive the connector, and an outer body adapted to slide over the inner body to a forward position. The sealing enclosure and a mating enclosure are axially secured in the forward position by a locking element. The locking element may be a bayonet-type lock. Such an enclosure is easy to assemble and protects and reliably seals the connector from harsh environmental conditions, such as in outdoor applications. The bayonet-type lock combines the forward motion, which leads to the sealing of the connector volume by the sealing member at the rearward end of the enclosure, with a limited rotational locking motion for the axial lock. Due to the limited rotational motion, the torsion introduced into the sealing member is limited.

U.S. Pat. No. 7,338,214 discloses an enclosure assembly in which the inner body is a plug body and the outer body is a shell having a bayonet-type lock. A connector is fixably mounted in the plug body at a predetermined position.

European Patent No. 2354825 similarly discloses an enclosure assembly in which, to facilitate and ensure the sealing of the connector volume at a rearward end, the inner body has a clamping section open in the rearward direction. The sealing member slides along a strain relief element into the clamping section. The clamping section has a retainer open in the rearward direction for receiving the sealing member. In the forward position of the outer body, the clamping section is radially compressed onto the sealing member, which in turn is radially pressed onto the fastening portion of the strain relief element and the sealing member. This makes the enclosure assembly more suitable to withstand torsional strain.

European Patent No. 2579396 discloses a sealing enclosure having an electromagnetic shielding structure located within the inner body. The signal integrity of the connector is improved because the shielding structure protects the connector not only from harsh environmental conditions and mechanical hazards, as described above, but also from electromagnetic fields, electromagnetic noise, and lightning strikes. The connector disposed within the connector volume is, in most cases, already provided with shielding. The enclosure assembly adds extra protection without limiting the movability of the connector within the connector volume. By locating the electromagnetic shielding structure within the inner body, as disclosed in European Patent No. 2579396, the interaction of the inner and outer body known from the European Patent No. 2302431 and European Patent No. 2354825 remains unchanged. The electromagnetic shielding structure constitutes an additional barrier against mechanical impact.

The known electromagnetic shielding structure is formed from one or more essentially tubular solid wall elements. The electromagnetic shielding structure comprises a moveable shielding substructure and a fixed shielding substructure. The movable shielding substructure slides over the cables and is held, at least with respect to a movement of the inner body towards a forward position and/or a forward direction, by the inner body. The inner body and the moveable shielding substructure are handled as a unit. The fixed shielding substructure is fixed on the cable and the movable shielding substructure slides over the fixed shielding substructure in the forward direction. The known electromagnetic shielding structure essentially mirrors the structure of the enclosure assembly by providing a part to be mounted on the cable and a part to be moved along the cable.

The moveable and fixed substructures are automatically connected to each other in an electrically conductive manner during a movement of the inner body in the forward direction, such as a movement to an operation position. An operator does not need to connect the moveable and the fixed shielding substructure in the field, as this connection is established once the inner body is moved forward towards its operating position. The connection of the fixed and moveable shielding substructure may be located at the removal section and/or end of the connector volume.

The fixed shielding substructure and the moveable shielding substructure are connected to each other via radially deflectable contact spring. The contact springs may be part of a ring-like element, which is mounted on the end of the moveable shielding substructure. European Patent No. 2579396 discloses two contact springs, one at the rearward end and one at the forward end. The contact spring at the rearward end contacts the fixed shielding substructure. The contact spring at the forward end contacts a mating enclosure, which may be a bulkhead on a cabinet. The contact spring is a ring-like structure comprising a plurality of contact springs arranged side by side along the peripheral direction. The spring fingers are radially deflectable.

At the rearward end, the contact spring projects radially inwards and is in contact with the fixed substructure. At the forward end the contact spring is arranged on the outer surface of the fixed shielding element. The tongues of the plurality of contacts springs are elastically pressed against the shielding element. The outer body is slid over the inner body and the enclosure assembly is coupled to the mating enclosure. During the last assembly steps, the spring fingers or contact springs in the forward end may be exposed to external stress and can easily get damaged.

SUMMARY

An object of the invention, among others, is to provide an electromagnetic shielding structure having resistant and stable contact springs with reliable mechanical behavior. The electromagnetic shielding structure according to the invention comprises a tubular hollow body and an inner housing. The tubular hollow body has a plurality of contact springs disposed in an annular orientation. The inner housing is disposed within the contact springs and protects the contact springs.

BRIEF DESCRIPTION OF THE DRAWINGS

The invention will now be described by way of example with reference to the accompanying Figures, of which.

DETAILED DESCRIPTION OF THE EMBODIMENTS

Figure 1:
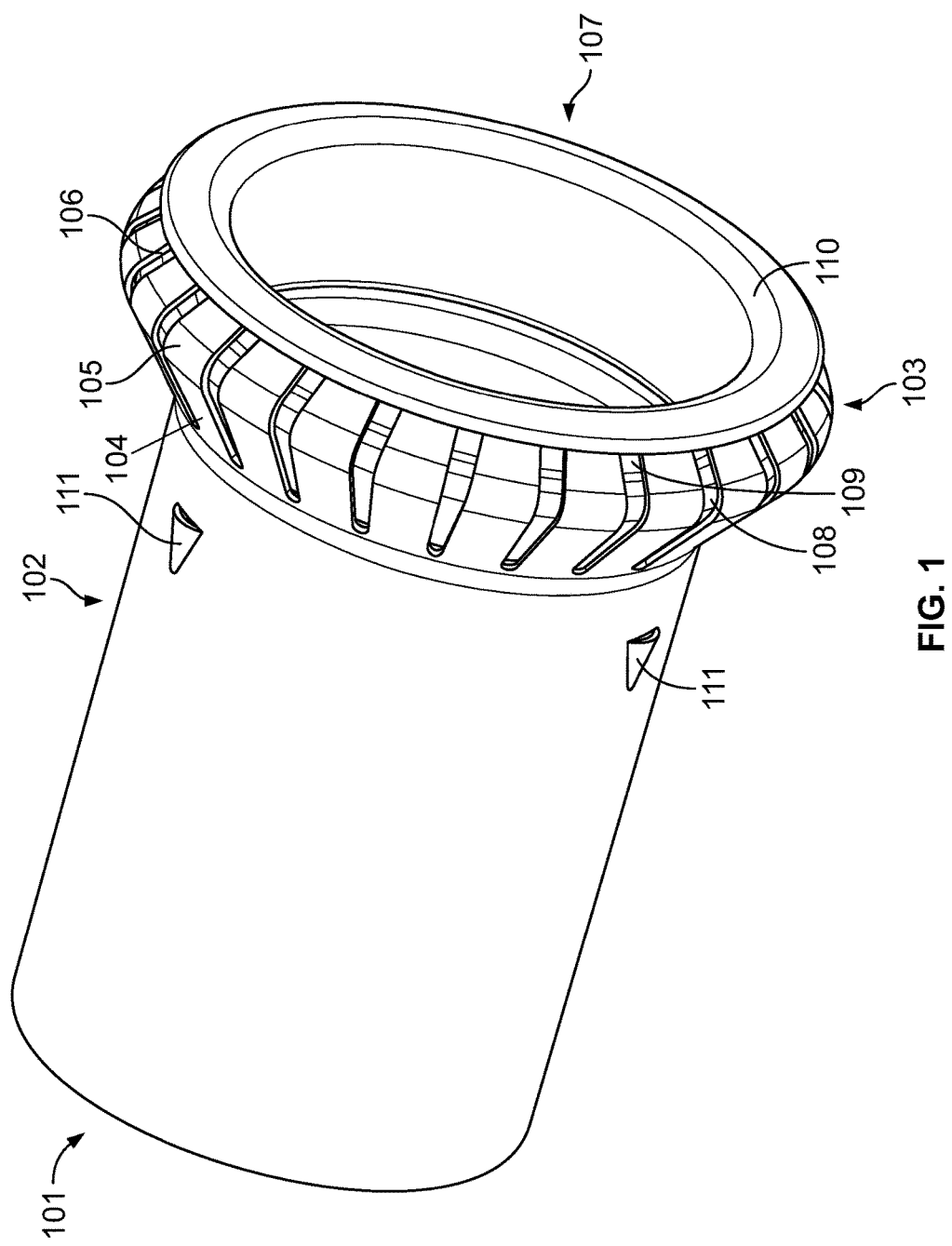
FIG. 1 is a perspective view of an electromagnetic shielding structure according to the invention.

Embodiments of the present invention will be described hereinafter in detail with reference to the attached drawings, wherein like reference numerals refer to the like elements. The present invention may, however, be embodied in many different forms and should not be construed as being limited to the embodiments set forth herein; rather, these embodiments are provided so that the disclosure will be thorough and complete and will fully convey the concept of the invention to those skilled in the art.

An electromagnetic shielding structure 101 according to the invention is shown in FIG. 1. The electromagnetic shielding structure 101 has a body 102, a plurality of contact springs 103, and an inner housing 107. The major components of the invention will now be described in greater detail.

The body 102, as shown in FIG. 1, is a unitary cylindrical or tubular hollow body 102 in which a diameter at a rearward end and a diameter at a forward end are the same. In other embodiments, the diameter at the rearward end may be smaller than the diameter at the forward end. The tubular body 102 is formed of a metallic material such as copper alloy, stainless steel, nickel, zinc alloy.

The body 102, as shown in FIG. 1, has a plurality of retainers 111 disposed on a surface of the body 102 adjacent the forward end. The retainers 111 project from the surface of the body 102. Between two and twelve retainers 111 may be used, and in the shown embodiment, two retainers 111 are disposed on the body 102.

The contact springs 103, as shown in FIG. 1, are integrally formed with the body 102 and are prolongations of the body 102. The body 102 and contact springs 103 can be manufactured with a deep drawn molding process or a molding and forming process. The electromagnetic shielding structure 101 has at least three contact springs 103. The contact springs 103 are disposed in an annular orientation and are radially deflectable. In other embodiments, the contact springs 103 are disposed in an annular orientation and are removably attachable to the tubular body 102.

Each contact spring 103, as shown in FIG. 1, has a first section 104, a second section 105, and a third section 106. The first section 104 projects radially outwards and the second section 105 forms a bend and turns into the third section 106 formed as a tongue projecting inwards. The contact springs 103 are made of the same metallic material as the body 102 and are nickel plated, tin plated, silver plated, gold plated, palladium-nickel plated, or treated with other kind of plating suitable for contacting an the inner hole of an application housing, as described in greater detail below.

The inner housing 107, as shown in FIG. 1, is disposed within the contact springs 103. In an embodiment, the inner housing 107 is pre-assembled within the contact springs. The inner housing 107 is formed of a plastic or a metal material. The inner housing 107 has a circular shape and a cross section shaped to fit into the body 102 and limit the movement of the contact springs 103; the inner housing 107 is inserted inside the body 102 and locked in the inside of the retainers 111. As shown in FIG. 1, the inner housing 107 has a first section 108 at a first end extending outward, a central second section 109 shaped to accept an end of the contact springs 103, and a circumferential lip 110 disposed at an opposite second end. The lip 110 protects the third section 106 of the contact springs 103 by covering the third section 106 in a direction extending along a longitudinal direction of the body 102 so that no entangling with a wire or similar can happen during transport. The central section 109 has a U-shaped cross section on which the third sections 106 are elastically pressed.

Figure 2:
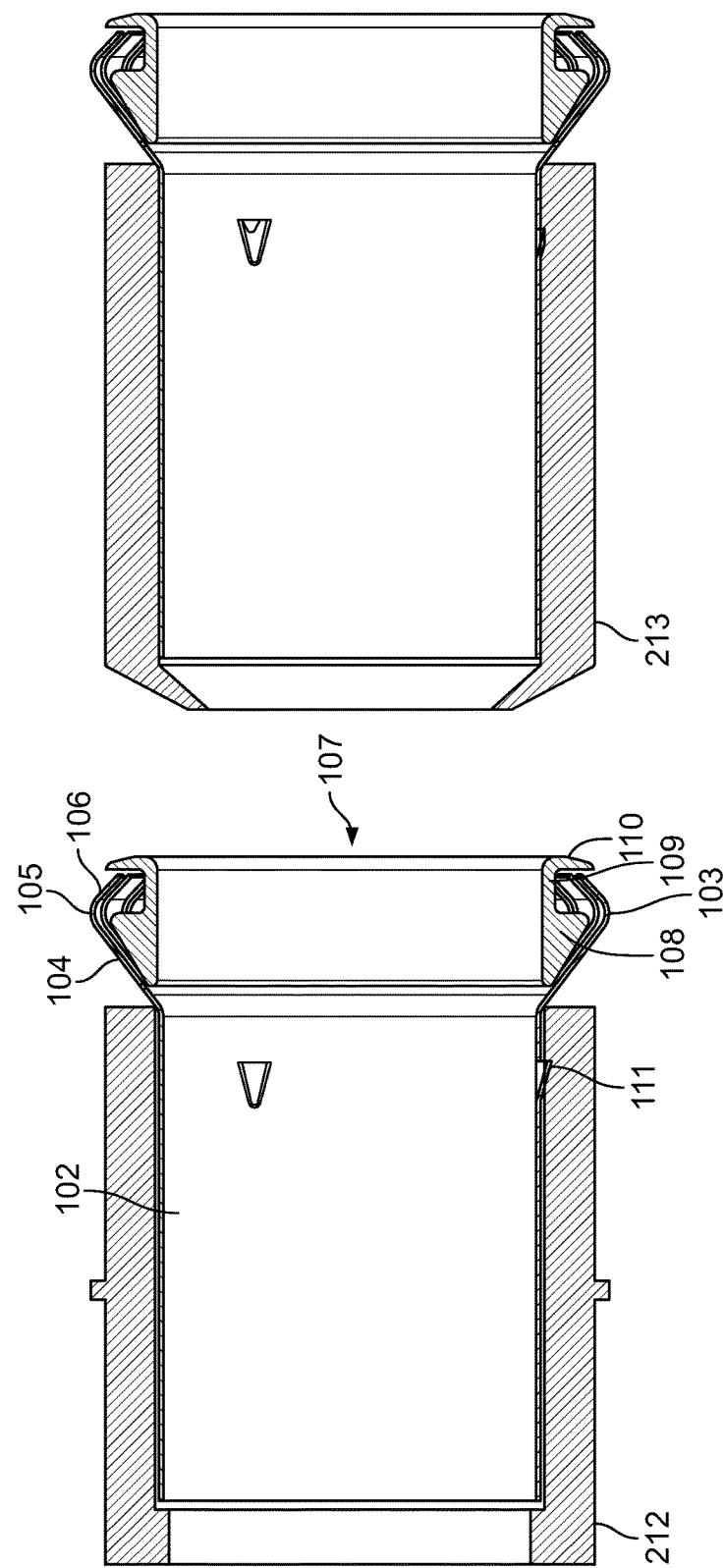
FIG. 2 is a sectional side view of the electromagnetic shielding structure inserted into different outer housings.

The electromagnetic shielding structure 101, as shown in FIG. 2, is insertable into different types of outer housings 212, 213. The outer housings 212, 213 are formed of an insulative material such as plastic. The body 102 is fixed within the outer housing 212, 213 by the retainers 111. The lip 110 protects the third section 106 of the contact springs 103 from damage when blind mated to the outer housing 212, 213. The lip 110 additionally helps avoiding slippage of the third sections 106 to the front and can be used to press the body 102 into the outer housing 212, 213.

Figure 3:
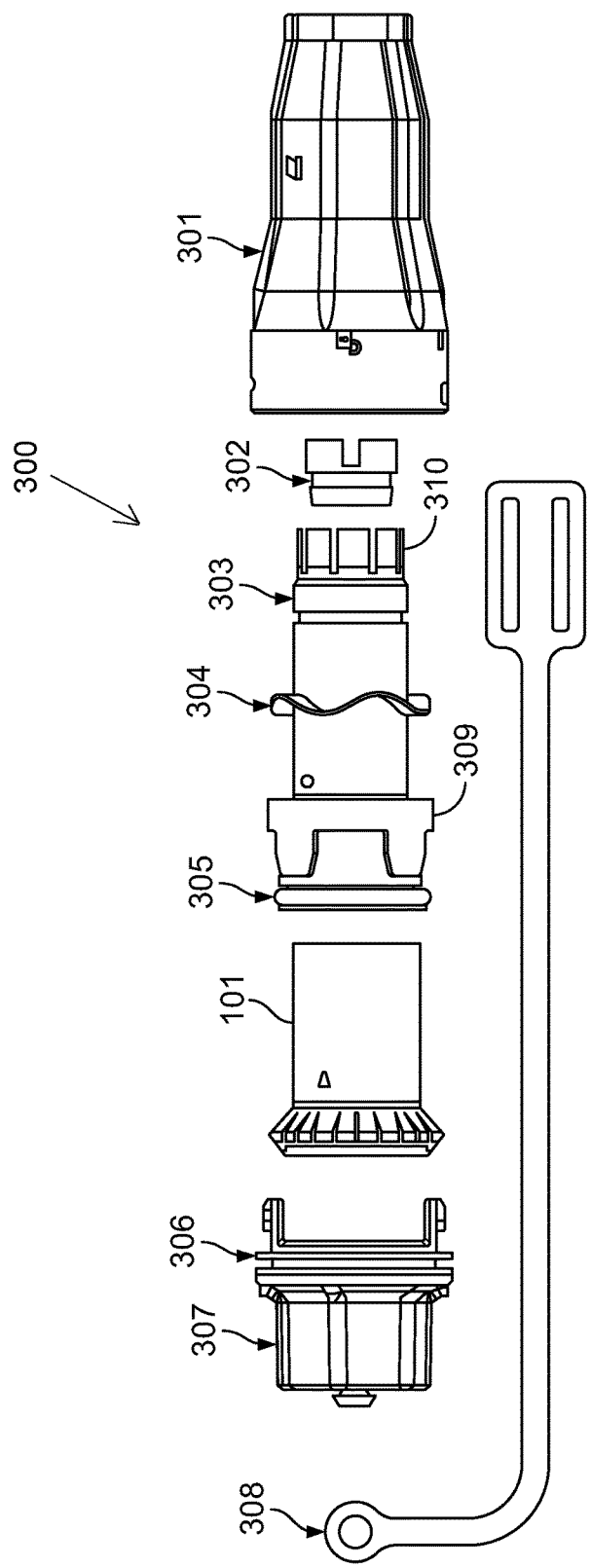
FIG. 3 is a top view of an enclosure assembly according to the invention having the electromagnetic shielding structure.

The outer housing into which the electromagnetic shielding structure 101 fits can be an inner body 303 of an enclosure assembly 300, as shown in FIG. 3. The enclosure assembly 300 comprises an outer body 301, an inner body 303, the shielding structure 101, a retainer or cable seal 302, and a front seal 306.

The enclosure assembly 300 contains different kind of cables, such as fiber-optic cables. The enclosure assembly 300 further sealingly encloses connectors mounted on an end of the cables, such as small form factor pluggable (SFP), high speed IO (micro SFP) (HSIO), multi-fiber push on (MPO), mass transfer push on (MTP), high definition multimedia interface (HDMI), optical transceivers, RJ45, or any other type of connectors for power and or data transmission known to those with ordinary skill in the art.

Figure 4:
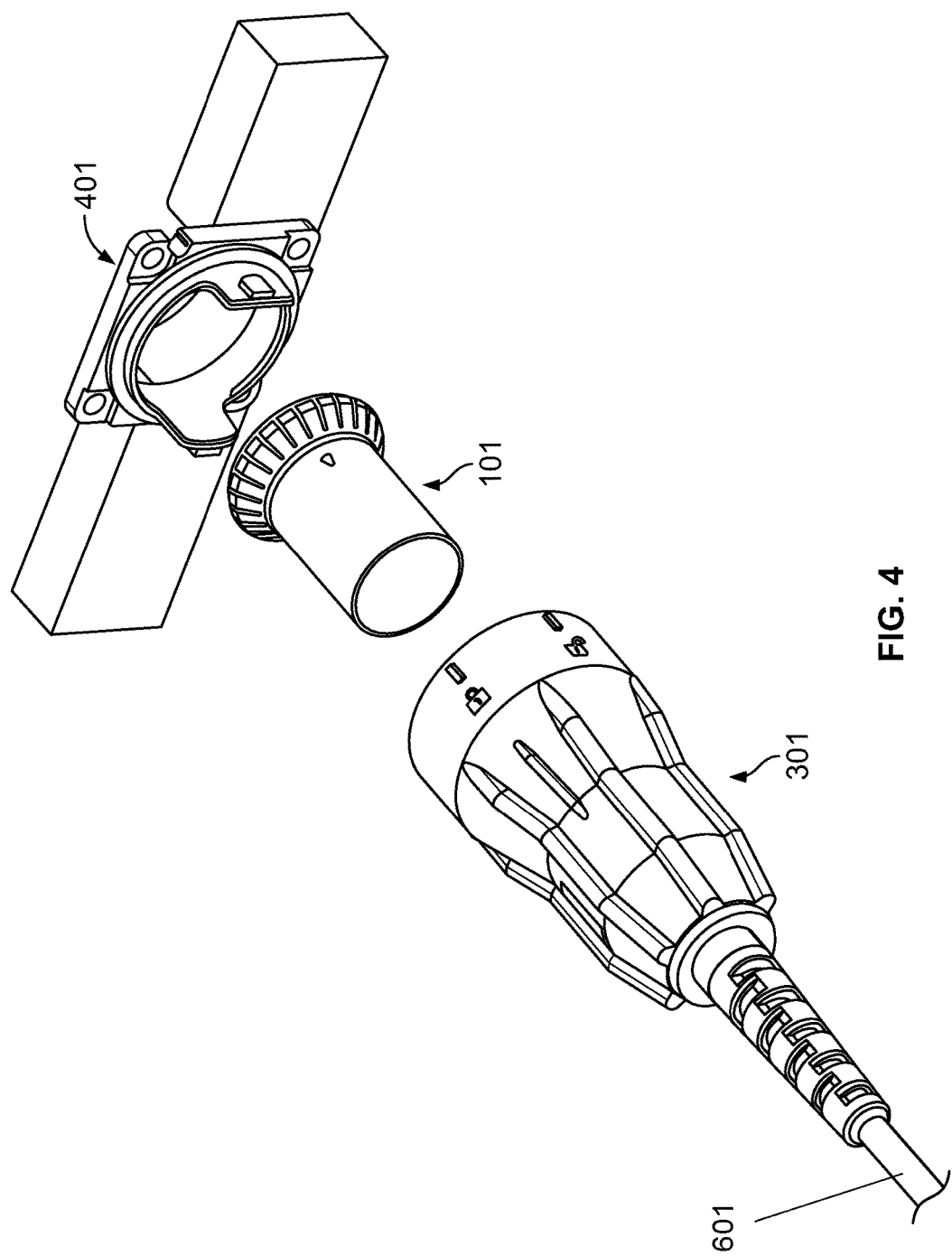
FIG. 4 is a perspective view of the enclosure assembly and a bulkhead.

In the following, the direction "forward" is defined for the enclosure assembly 300 as facing in the direction of the end of the cable or a mating enclosure assembly; to the left in the orientation of FIG. 3. The direction "rearward" designates the opposite direction, the direction facing away from the mating enclosure assembly. If the enclosure assembly is mounted or being mounted on a cable 601, as shown in FIG. 4, the forward and rearward direction run parallel to the cable 601.

The outer body 301 of the enclosure assembly 300 slides over the inner body 303 in the forward direction and can be secured in a forward position to the front seal 306 by a locking element after a rotating movement. In an embodiment, the outer body 301 is formed of plastic and has a shape of a cylindrical or frusto-conical hollow shell. The length of the outer body 301 in the longitudinal direction is about the same as the length of the inner body 303.

The inner body 303 has a cylindrical shape, as shown in FIG. 3, and is mounted on and slid along the cable 601. The inner body 303 has a clamping section 310 located at the rearward end and a plug section 309 located at the forward end. The inner walls of the inner body 303 define the connector volume. The connector volume is dimensioned to loosely receive the connector in the forward direction. It has a cylindrical or generally conical shape tapering in the rearward direction. The sealing at the forward end is established or reinforced by the O-ring 305. The central section of the inner body 303 supports the installment and sliding of the inner body 303 on the cable 601. The inner body 303 has a wave spring 304 disposed circumferentially around the central section of the inner body 303. The wave spring 304 prevents rearward movement of the outer body 301 to ensure the locking of the locking element.

The electromagnetic shielding structure 101 is disposed between the inner body 303 and the connector volume with the contact spring 103 located at the forward end of the electromagnetic shielding structure 101. The body 102 of the electromagnetic shielding structure 101 is fixed within the inner body 303 by the retainers 111. A diameter of the contact springs 103 is the same or approximately the same as an inner diameter of the connector volume. The electromagnetic shielding structure 101 is covered almost completely by the inner body 303, with the exception that at the forward end the contact springs 103 are exposed and extend away from the inner body 303. This positioning avoids losing contact points of the contact springs 103 or having the electromagnetic shielding structure 101 stuck inside the inner body 303. The contact springs 103 do not project into the connector volume, as this may create interference with the freely moveable cables and connectors.

A cable plug dust cap 307, as shown in FIG. 3, acts as protection during transportation while the front seal 306 protects from dust and water inside the dust cap 307. The dust cap 307 is secured to the enclosure assembly 300 for later use after installation by the plug cap strap or wire 308.

An exemplary installation of the enclosure assembly 300 is shown in FIG. 4. The electromagnetic shielding structure 101 is first inserted into the inner body 303 and the outer body 301 is then slid forward on the cable 601 over the inner body 303 and shielding structure 101. At this stage, the rearward end of the inner body 303 is covered completely by the outer body 301 and then mated to a bulkhead 401 of an application enclosure housing 501 by the locking elements.

Figure 5:
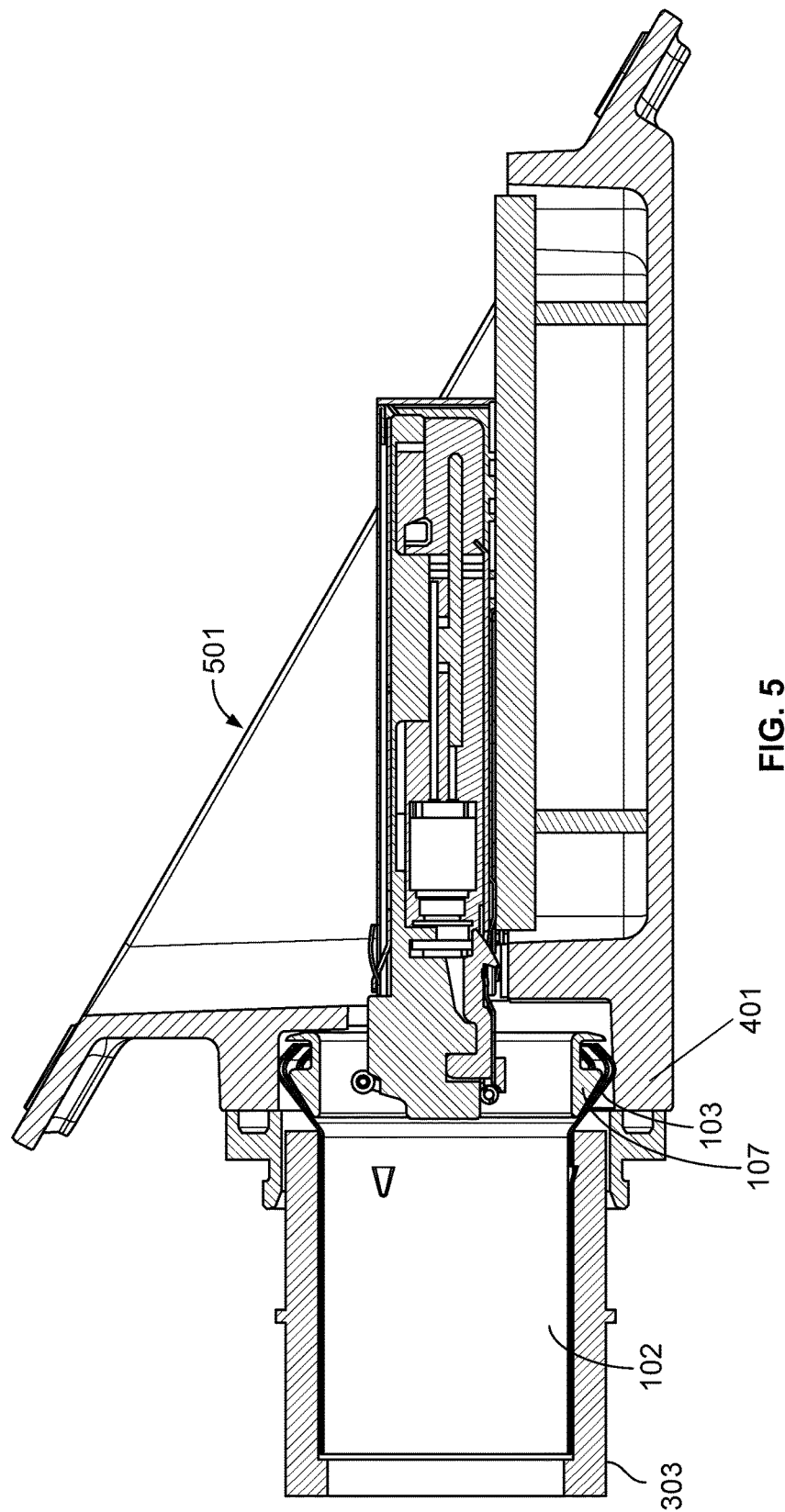
FIG. 5 is a sectional side view of the electromagnetic shielding structure coupled to an application enclosure housing at the bulkhead.

The enclosure assembly 300, as shown in FIG. 5, is coupled to the application enclosure housing 501 at the bulkhead 401. An electrical contact is established between an outer surface of the contact springs 103 and an inner surface of the bulkhead 401. The contact springs 103 are plated with a material that forms a reliable electrical connection with the inside of the bulkhead 401.

In an embodiment, the application enclosure housing 501 is a portion of a remote radio unit used for wireless communication connecting a fiber-optic cable to an antenna. The connector protected by the enclosure assembly 300 is a fiber-optic cable connector, the fiber-optic cable connector connected to a transceiver in the remote radio unit. In the remote radio unit, an optical high frequency signal is transferred to an electrical high frequency signal that is susceptible to electromagnetic interference. The electromagnetic shielding structure 101 increases the depth of the opening in the remote radio unit, as shown in FIG. 5, thereby preventing frequency noise from disturbing high frequency data transmission. The existing wireless communication system technology may therefore be increased from 4 GHz to 10 GHz and 5 Gbps to 10 Gbps in the fiber optical transceiver. The same form of connection can be used with other embodiments applied to other applications.

What is claimed is:

1. An electromagnetic shielding structure for an electrical connector, comprising:
    a tubular hollow body having a plurality of contact springs disposed in an annular orientation; and
    an inner housing disposed within the contact springs and protecting the contact springs, the inner housing having a circumferential lip covering an end of each contact in a direction extending along a longitudinal direction of the body.

2. The electromagnetic shielding structure of claim 1, wherein the inner housing is pre-assembled within the contact springs.

3. The electromagnetic shielding structure of claim 1, wherein the body is integrally formed with the contact springs.

4. The electromagnetic shielding structure of claim 3, wherein the body is formed of metal.

5. The electromagnetic shielding structure of claim 1, wherein the contact springs are disposed on an end of the body.

6. The electromagnetic shielding structure of claim 1, wherein the contact springs are radially deflectable.

7. The electromagnetic shielding structure of claim 1, wherein the inner housing is formed of plastic or metal.

8. The electromagnetic shielding structure of claim 1, wherein each contact spring has a first section projecting radially outward from the body, a second section forming a bend, and a third section formed as a tongue projecting inward toward an interior of the body.

9. The electromagnetic shielding structure of claim 1, wherein the inner housing has a circular shape with a cross-section shaped to fit into the body.

10. The electromagnetic shielding structure of claim 9, wherein the inner housing has a first section at a first end extending outward, a central second section, and the circumferential lip disposed at an opposite second end.

11. The electromagnetic shielding structure of claim 10, wherein each contact spring has a first section projecting radially outward from the body, a second section forming a bend, and a third section formed as a tongue projecting inward toward an interior of the body.

12. The electromagnetic shielding structure of claim 11, wherein the circumferential lip covers an end of the third section of each contact in the direction extending along the longitudinal direction of the body.

13. The electromagnetic shielding structure of claim 11, wherein the third section of each contact is disposed in the central second section of the inner housing.

14. The electromagnetic shielding structure of claim 10, wherein the first section of the inner housing is inclined with respect to the longitudinal direction of the body.

15. The electromagnetic shielding structure of claim 14, wherein the circumferential lip extends orthogonal to the longitudinal direction of the body.

16. The electromagnetic shielding structure of claim 15, wherein the central second section of the inner housing is U-shaped.

17. An enclosure assembly for an electrical connector, comprising:
- an inner body defining a connector volume receiving the electrical connector, the inner body open at a forward end and an opposite rearward end;
- an outer body adapted to slide over the inner body; and
- an electromagnetic shielding structure disposed between the inner body and the connector volume, the electromagnetic shielding structure having a tubular hollow body with a plurality of contact springs disposed in an annular orientation and an inner housing disposed within the contact springs and protecting the contact springs.

18. The enclosure assembly of claim 17, wherein the electrical connector is movable within the connector volume.

19. The enclosure assembly of claim 17, wherein the contact springs are disposed at the forward end of the inner body.

20. The enclosure assembly of claim 19, wherein the contact springs form an electrical connection with an application enclosure housing.

21. The enclosure assembly of claim 17, wherein the body of the electromagnetic shielding structure has a plurality of retainers.

22. The enclosure assembly of claim 21, wherein the electromagnetic shielding structure is connected to the inner body by the retainers.

* * * * *